(12) United States Patent
Cina et al.

(10) Patent No.: US 12,521,494 B2
(45) Date of Patent: Jan. 13, 2026

(54) MIXING SYRINGE

(71) Applicant: S-VIAL MEDICAL LTD, Or Akiva (IL)

(72) Inventors: Yaron Cina, Moshav Sharona (IL); Shlomo Uri Haimi, Or Akiva (IL); Ronen Levin, Haifa (IL)

(73) Assignee: S-VIAL MEDICAL LTD, Or Akiva (IL)

( * ) Notice: Subject to any disclaimer, the term of this patent is extended or adjusted under 35 U.S.C. 154(b) by 591 days.

(21) Appl. No.: 18/092,956

(22) Filed: Jan. 4, 2023

(65) Prior Publication Data

US 2024/0216617 A1 Jul. 4, 2024

(51) Int. Cl.
*A61M 5/315* (2006.01)
*A61M 5/24* (2006.01)
*A61M 5/31* (2006.01)

(52) U.S. Cl.
CPC ...... *A61M 5/31596* (2013.01); *A61M 5/2455* (2013.01); *A61M 5/31533* (2013.01); *A61M 2005/3128* (2013.01)

(58) Field of Classification Search
CPC ............ A61M 5/31596; A61M 5/2455; A61M 5/31533; A61M 2005/3128
See application file for complete search history.

(56) References Cited

U.S. PATENT DOCUMENTS

| | | | |
|---|---|---|---|
| 2013/0211248 A1* | 8/2013 | Cowan | A61M 5/2425 600/432 |
| 2018/0264195 A1* | 9/2018 | Hopkins | A61M 5/31513 |
| 2020/0368433 A1* | 11/2020 | Schabbach | A61M 5/19 |
| 2022/0142867 A1* | 5/2022 | Kim | A61J 1/2089 |

* cited by examiner

*Primary Examiner* — Dung T Ulsh
(74) *Attorney, Agent, or Firm* — Rivka Friedman (57) ABSTRACT

A mixing syringe, including: a barrel; a hollow plunger disposed inside the barrel, the hollow plunger having a stopper disposed on a distal end thereof and an open proximal end; a flexible container disposed inside the hollow plunger, the container containing a first material; a metering rod adapted to be inserted in the open proximal end of the hollow plunger so as to enclose the container therein, the metering rod adapted to be advanced within the hollow plunger from the open proximal end to the distal end thereof in predetermined increments.

19 Claims, 8 Drawing Sheets

MIXING SYRINGE

FIELD OF THE INVENTION

This application relates to medical syringes. More particularly this application relates to a syringe that is used to mix a first material (usually a liquid, but in some cases, a gaseous state material) with a second material (usually a liquid, but in some cases, a including solid particles such as a powder) in the barrel of the syringe where the first material is stored in a hollow plunger of the syringe and the second material is either present in the barrel or extracted from an external source. For example, the syringe can be used to mix drugs with reagents, such as alkalinization of anesthetic solutions, including for dental applications.

BACKGROUND OF THE INVENTION

For various reasons, some materials must be stored and transported apart from their reagents and then, just prior to use, they are mixed with their reagents.

For example, in the medical field some drugs must be stored and transported apart from their reagents and then, just prior to administration to patients, they are mixed with their reagents. For example, local anesthetics are sometimes mixed with Sodium Bicarbonate ($NaHCO_3$) buffering solution just prior to injection into patients. One reason for delaying the mixing of drugs with their reagents is that such mixing starts accelerated degradation which shortens the shelf life of the anesthetic drug.

Local anesthetic drugs exert their effect by blocking transmission of the nerve signal in the area of the nerve where the anesthetic drug has been deposited. Generally speaking, anesthetic drugs are acidified by pharmaceutical manufacturers to an acid pH of about 3.5 (equivalent to lemon juice) to obtain adequate shelf life. This acidic solution is painful to patients when injected and therefore adds one more reason for patients to resent injections at the dentists' or physicians' office. In addition, the anesthetic drug does not exert any effect at this low "storage" pH, so both the patient and the dentist/physician must wait several minutes after injection and before the numbness begins, while patient's body slowly brings the pH level up to that of the body tissues, which is about 7.4.

Overwhelming evidence demonstrates that raising the pH of the anesthetic to a pH closer to neutral just prior to injection, also known as alkalinization, and colloquially known as "buffering", greatly decreases the pain associated with injection, as well as the latency of the anesthetic effect. Because of this, many inventors over several decades have attempted to help make buffering a widespread practice in both dentistry and medicine, but at present no method has been satisfactory for several reasons.

Liquid state Sodium Bicarbonate ($NaHCO_3$) at a concentration of 8.4% is the most common solution used to buffer anesthetics. The $NaHCO_3$ solution and the local anesthetic solution are typically mixed in a ratio of about 9 parts anesthetic to 1 part $NaHCO_3$ solution.

When physicians, such as dermatologists and plastic surgeons, buffer their anesthetic, they first draw anesthetic solution into their syringe from a vial, and then add $NaHCO_3$ solution to the syringe by withdrawing it from a separate vial. This method is somewhat cumbersome, time-consuming, and uneconomical. However, despite its disadvantages, many physicians buffer their anesthetic injections, as it makes a significant difference in the patient's comfort when performed properly.

In the oral environment, because of the special need for dexterity, dentists typically inject the anesthetic solution with a reusable hand-held metal syringe, which has evolved and been consolidated into a single design that accounts for almost all syringes in use in dentistry and oral surgery. This syringe is used in conjunction with a disposable double-sided injection needle which is attached to the syringe and a specialized glass drug vial called a "cartridge" or "carpule" of anesthetic solution, which is placed into the syringe. As the cartridge is placed into the syringe, the cartridge is pierced by the back end of the double-sided needle, so that solution can flow out and through that needle. The cartridge has a piston that is driven by a pushrod on the syringe, so that when the dentist pushes on the pushrod the piston drives the solution through the attached needle.

A notable and important difference between a dental cartridge and a typical drug vial is the size. A dental cartridge volume is typically less than 2 mL, due mainly to limitations imposed by the conventional dental syringe fitting in the operator's hand and its use in patient's mouth, whereas a typical drug vial has a volume of 10-100 mL. The use of dental cartridges therefore increases the likelihood of multiple injections to the same patient, which may result in more pain and uncomfortable feeling. Furthermore, since conventional dental syringes do not include volume markings, dentists that use those syringes are unable to determine the accurate dose of the anesthetic drug injected to a particular patient, especially when the volume injected to that patient is less than that of a whole cartridge.

Dentists who buffer their anesthetics typically use one of two commercially available systems. Both of these systems add considerable time and expense to the procedure. The ongoing product cost per injection of the commercially available systems is many times that of an unbuffered protocol. One of these systems does enable dentists to use a disposable syringe. This system, however, requires a bulky countertop device that stores both the anesthetic solution and the $NaHCO_3$ solution in a vial and cartridge respectively and is used to load the disposable syringe. This is time consuming, expensive, and cumbersome.

Another system utilizes an injector that introduces $NaHCO_3$ into the standard dental cartridge. This system requires that each cartridge be separately loaded with $NaHCO_3$, which is time consuming, and in some jurisdictions legally prohibited except by licensed pharmacists. In addition, this system causes a significant loss of available drug volume in the cartridge and breaches the sterile and pharmacological protocol.

In spite of their disadvantages, both systems have found a limited market, demonstrating that buffering is very desirable from both a dentist's and a dental patient's perspective. However, making the buffering process less time consuming, less expensive, friendlier, and safer would result in more widespread use for the benefit of both patient and dentist.

Some physicians who buffer their anesthetics are desirous of using another system that is still not commercially available and is intended to enable the physicians and dentists to draw and mix anesthetic medications using only one vial or only one cartridge. As a dental application, this system still requires the use of a bulky and scary, especially for children, metal syringe that is required to be steam sterilized at the dental clinic after each use. Furthermore, the reliance on cartridges with their limited volume of anesthetic solution requires multiple injections in those instances that the volume of anesthetic stored in a single cartridge is not sufficient for local anesthesia of a particular patient. Furthermore, the cost per each mL of anesthetic is far more expensive when that anesthetic is packed in a relatively small volume cartridge than when it is packed in a relatively large volume vial.

There remains a need to provide a less tedious and expensive method for in situ mixing and administration of drug solutions with their reagents, notably including the buffering of local anesthetics.

Other advantages of one or more aspects will be apparent from the following disclosure and claims taken in conjunction with the accompanying drawings.

SUMMARY OF THE INVENTION

It would be preferable to have a system for physicians and dentists to draw from a relatively large volume vial only the required volume of drug solution (i.e., the entire drug volume required for a particular patient) and mix that fluid with a corresponding volume of an applicable reagent.

For example, in dentistry, drawing the entire determined volume of the anesthetic drug from its drug vial and buffering that volume inside the syringe would overcome the current volume limitation of one cartridge per one injection and would therefore reduce the number of injections to a particular patient, while not compromising the expiry date of the unbuffered anesthetic that remains inside the vial. It is hoped that use of the instant device will result in more widespread use of buffering and therefore in the increase of patient comfort and satisfaction.

There are provided various embodiments of the present invention including: a disposable syringe suited, inter alia, for use in dental procedures. The syringe includes a hollow plunger that contains a first material e.g., a reagent. The first material may be housed in a container, e.g., in a flexible material container. The device further includes a metering/dosage plunger/rod for both puncturing (e.g., causing the container to be punctured by/on a puncturing member, or actually causing the rupture under pressure) and gradually squeezing that container to expel the first material (e.g., fluid), into the barrel. Inside the barrel of the syringe, the first material mixes with a second material, e.g., an anesthetic drug, that has been previously, or is to be later, drawn into the barrel of the disposable syringe, using regular methods known in the art. The first liquid may be, for example, liquid state $NaHCO_3$ that is prepackaged in a reagent container.

The presented devices replace the bulky and scary (especially for children) metal syringe with a smaller sized syringe; enable dentists to precisely meter the volume of first material, for example, liquid state $NaHCO_3$, to react, for example by buffering, with a second fluid, for example anesthetic, before their mixture is injected into patients; lower the load of medical equipment to be steam sterilized at the dental office; replace the relatively expensive double-sided injection needles with less expensive hypodermic needles; encourage the use of local anesthetic buffering to become widespread; reduce pain in the administration of local anesthesia in medical and dental offices; and reduce waiting time before onset of local anesthesia in medical and dental offices.

The present device is a mixing syringe having a hollow plunger that includes a reagent container and a metering/dosage rod/plunger. The metering rod is initially positioned inside the hollow plunger and later further screwed (or otherwise advanced) towards the distal end of the hollow plunger by the user in order to push the reagent container to be punctured, including by a puncturing member, e.g., a spike located at the distal end of said hollow plunger. The distal end of the hollow plunger, e.g., the puncturing member, is preferably hollow so that puncturing the container creates a fluid path between the reagent container and the headspace in the barrel created between the egress port of the syringe and the distal end of the hollow plunger. Expelling the first material, e.g., reagent fluid, into the barrel gradually mixes the first material with the second material that was or will be conventionally drawn into that headspace or is initially present therein.

According to the present invention there is provided a mixing syringe, including: a barrel; a hollow plunger disposed inside the barrel, the hollow plunger having a stopper disposed on a distal end thereof and an open proximal end; a flexible container disposed inside the hollow plunger, the container containing a first material; a metering rod adapted to be inserted in the open proximal end of the hollow plunger so as to enclose the container therein, the metering rod adapted to be advanced within the hollow plunger from the open proximal end to the distal end thereof in predetermined increments.

According to further features in the container has a first state, whereby the container is sealed, and a second state whereby the skin of the container is ruptured as a result of the metering rod being advanced sufficiently to assert pressure on the container in a sufficient quantity so as to transform the container from the first state to the second state.

According to still further features the container is adapted to be ruptured as a result of being punctured by a puncturing member under the pressure asserted when the metering rod is advanced. According to still further features the puncturing member is a hollow spike disposed at a distal end of the hollow plunger, the hollow spike provides a fluid communication path between the container and an internal volume of the barrel.

According to still further features the stopper is permeable and provides a fluid path between the hollow plunger and the internal volume of the barrel. According to still further features the fluid path is unidirectional. According to still further features the unidirectional fluid path is afforded by a one-way valve. According to still further features the fluid path is capillary. According to still further features the capillary fluid path is of a diameter equal to or less than 0.2 mm.

According to still further features the metering rod has a threaded external surface and the hollow plunger has a corresponding threaded on an internal surface thereof such that the metering rod is advanced inside the hollow plunger by rotation of the metering rod.

According to still further features the predetermined increments are demarcated by geometric impediments and/or indicated by haptic feedback and/or indicated by audible feedback and/or indicated by visual feedback.

According to still further features the geometric impediments include at least two bumpers formed on an external surface of the metering rod and an inner barrier on an inner side of the hollow plunger. According to still further features the geometric impediments are engaged by the intersecting geometry resulting from the relative positioning of the at least one bumper in respect to the inner barrier.

According to still further features advancing the metering rod in the predetermined increments is effected by advancing the metering rod in a manner that overcomes the interfering geometry of the one of the at least two bumpers physically interacting with the inner barrier until a subsequent bumper of the at least two bumpers meets the inner barrier.

According to still further features the predetermined increments are determined by a space between the at least two bumpers. According to still further features the space between the at least two bumpers is determined by the linear length between facing edges of the at least two bumpers disposed along the metering rod. According to still further features the predetermined increments correspond to a volume of the first material compelled to flow between the container and an internal volume of the barrel.

According to still further features the geometric impediments include at least an inner barrier formed on an external surface of the metering rod and at least two bumpers formed an on an inner side of the hollow plunger.

According to still further features the flexible container is made of butyl rubber and/or laminated aluminum. According to still further features the first material contained inside the flexible container is in a liquid state or in a gaseous state.

According to another embodiment there is provided a system, including: the aforementioned mixing syringe; a medicament vial containing a liquid state medicament; a vial adapter attached at its proximal end to the mixing syringe and at its distal end to the medicament vial, the vial adapter having a one-way valve so as to prevent materials from exiting the barrel of the mixing syringe into the medicament vial.

According to still further features the proximal end of the vial adapter has a female Luer lock fitting.

According to still further features the system further includes a cap adapted to be attached to a distal end of the barrel following detachment of the vial adapter therefrom so as to prevent materials from exiting the barrel of the mixing syringe. According to still further features a proximal end of the cap has a female Luer lock fitting.

According to still further features a non-valved vial adapter that does not include a one-way valve is adapted to be used instead of the vial adapter.

According to another embodiment there is provided a method of mixing two materials in a syringe, including the steps of: (a) providing the mixing syringe of claim 1; (b) providing the second material in the barrel; (c) advancing the metering rod so as to transform the container from the first state to the second state; (d) advancing the metering rod by at least one increment of the predetermined increments to expel a predetermined quantity of the first material into the barrel to mix with the second material.

According to still further features the second material is a medicament. According to still further features the first material is a reagent to the medicament. According to still further features the first material is 8.4% Sodium Bicarbonate ($NaHCO_3$).

According to still further features the method includes performing steps (c) and (d) before step (b). According to still further features only step (a) is performed while a second material is already present inside the inner volume of the barrel.

According to still further features the second material is of a solid state. According to still further features the second material is in a powder form. According to still further features the powder form material is a lyophilized drug.

According to still further features. the first material is sterile, nonpyrogenic, distilled water for intravenous administration. According to still further features the first material is a mixture of salt and water. According to still further features the first material is used to reconstitute the second material.

BRIEF DESCRIPTION OF THE DRAWINGS

FIG. 4D-1 is a cross sectional view of one embodiment of the mixing syringe of the present invention, in which the metering rod is shown in its state after it has squeezed the flexible (e.g., reagent) container to expel the first material (e.g., fluid $NaHCO_3$), in a predetermined volume, into the barrel of the mixing syringe to mix with the second material (e.g. anesthetic drug) already present in the barrel when the barrel is still attached at its distal end to a medicament vial through a vial adapter;

FIG. 4D-2 is a cross sectional view of an embodiment of the mixing syringe of the present invention, in which the metering rod, the material container and the barrel of the mixing syringe are shown in the same state as depicted in FIG. 4D-1, except that the barrel is covered by a cap;

DESCRIPTION OF THE INVENTION

The principles and operation of a mixing syringe adapted to provide a metered dosage of a first material from a hollow plunger into the barrel of the syringe according to the present invention may be better understood with reference to the drawings and the accompanying description.

Figure 1:
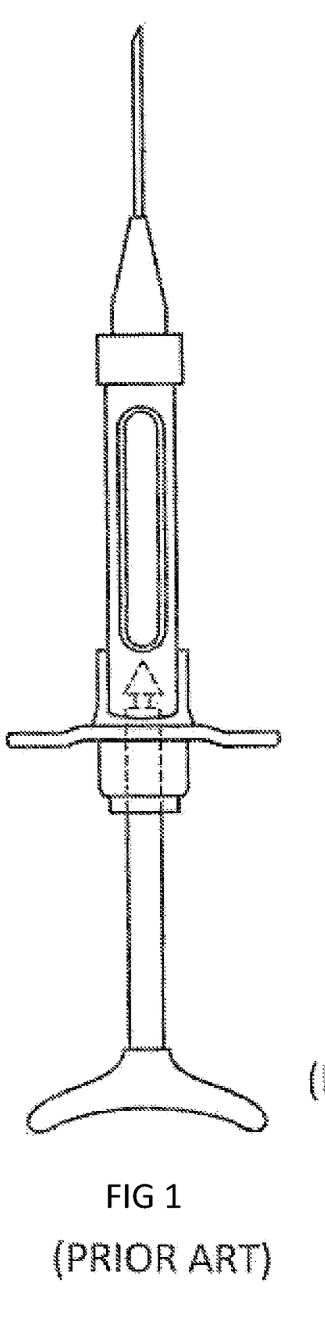
FIG. 1 is a side elevation of a conventional prior art dental syringe apparatus connected to a prior art double-sided needle for use in combination with a prior art cartridge of anesthetic drug, all replaced by the present invention.
Figure 2:
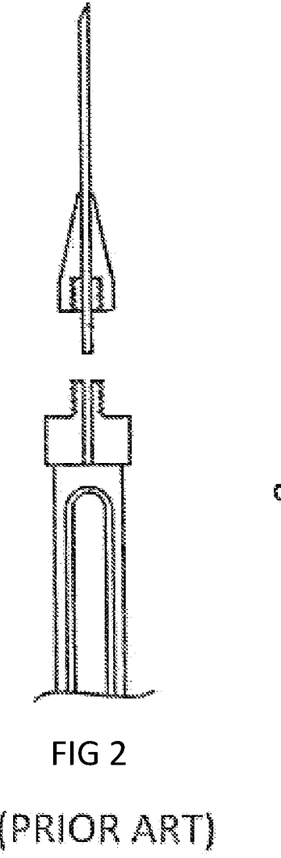
FIG. 2 is an exploded sectional view, broken away, of the prior art conventional dental syringe apparatus and the double-sided needle of FIG. 1, both replaced by the present invention.
Figure 3:
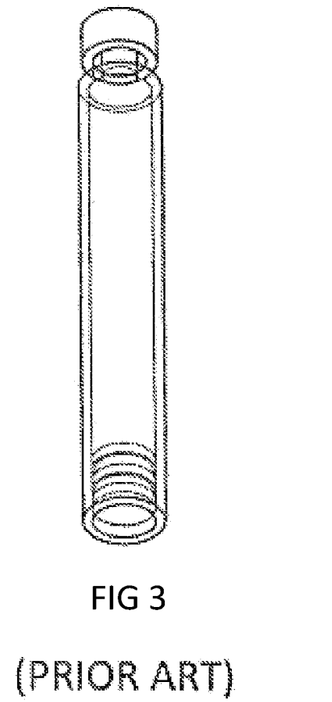
FIG. 3 is a perspective view of a prior art dental cartridge replaced by the present invention.

Now referring to the drawings, a conventional prior art syringe/needle apparatus is illustrated in FIGS. 1 and 2 while a conventional prior art cartridge is illustrated in FIG. 3. The prior art syringe/needle apparatus of FIGS. 1 and 2 is suitable for use in conjunction with the prior art cartridge of FIG. 3.

Figure 4A:
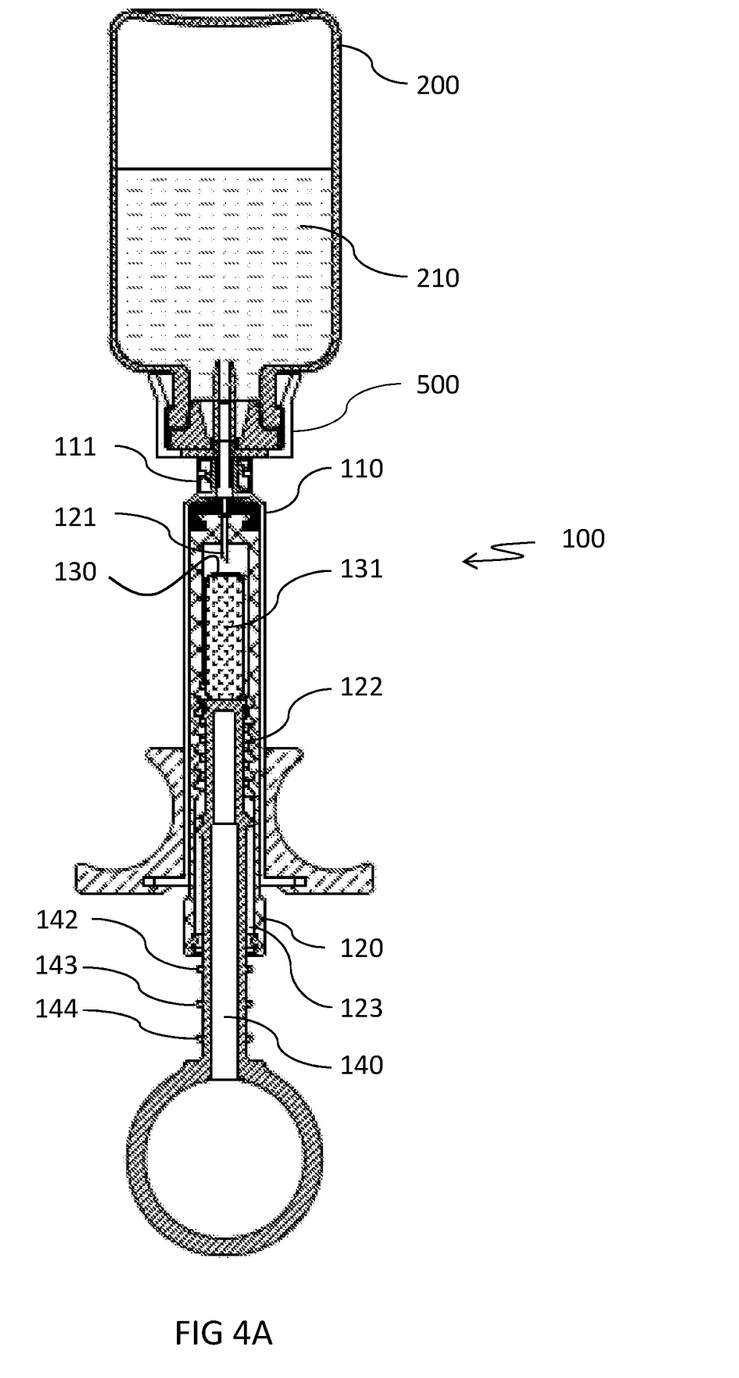
FIG. 4A is a cross sectional view of an embodiment of a mixing syringe of the present invention, operationally coupled to a large medicament vial through a vial adapter.

FIGS. 4A-4F depict a mixing syringe of the instant invention in various states and situations. The descriptions of the components of the mixing syringe apply to all of FIGS. 4A-4F. FIG. 4A depicts a cross sectional view of an embodiment of a mixing syringe 100 of the present invention, operationally coupled to a large medicament vial 200. The mixing syringe is part of a system that includes the mixing syringe 100 a medicament vial 200, and a vial adapter 500. The vial and adapted are replaceable with a needle 300 or a cap 400.

The mixing syringe 100 is comprised of a barrel 110 which, in an example embodiment, is a standard syringe barrel. In an example embodiment, the barrel has a standard male Luer lock fitting 111 at its distal end. It should be understood, however, that any other fitting is within the scope of the present invention.

The mixing syringe 100 further consists of a hollow plunger 120, having a material container 130 containing a first material and a metering/dosage rod 140 removably or non-removably disposed therein.

Throughout the present document, the material initially disposed in the hollow plunger 120 (e.g., in container 130) is referred to as a 'first material'. However, for the sake of convenience and clarity, this material may alternatively be referred to as a 'liquid', 'fluid' 'first liquid', 'first fluid', 'reagent', 'reagent liquid/fluid', and variations thereof. It is made clear that any use of a specific material such 'liquid' or 'reagent' is merely an example and by no way intended to limit the scope of the invention. Accordingly, as mention of a specific type of material as opposed to the wider term 'first material' is to be understood meaning the "a first material, such as a liquid" or "a first material, such as a reagent", etc.

To be clear, the term 'first material' includes a solid, liquid, gas, any intervening state therebetween, and/or combinations thereof. For example, the material may refer to a gas, a liquid, a liquid with solid/insoluble particles disposed therein, a gel, a gel with solid/insoluble particles disposed therein, solid particles such as powder, and any combination thereof.

According to embodiments, as mentioned, the first material is disposed in container 130. The container 130 has a first state, whereby the container is sealed, and a second state whereby the skin of the container is ruptured. The container can be ruptured in various ways. In embodiments, the container is ruptured as a result of the metering rod being advanced sufficiently to assert pressure on the container in a sufficient quantity so as to transform the container from the first state to the second state.

In embodiments, the pressure on the container causes the container to burst.

In other embodiments, the container 130 is adapted to be ruptured as a result of being punctured by a puncturing member under the pressure asserted when the metering rod 140 is advanced.

In one example embodiment of the present invention, a puncturing member is disposed at a distal end of the hollow plunger. In one example embodiment, the puncturing member is a spike 121 that protrudes from the distal end (i.e., the inner side of the distal wall) of the hollow plunger 120. In embodiments, the spike 120 is a hollow spike. The hollow spike 120 provides a fluid communication path between the container and an internal volume of the barrel.

In other example embodiments, there is no spike disposed inside the hollow plunger. In still other embodiments, there is a spike, but the spike is not hollow. In embodiments, such as the embodiments without a hollow spike, the stopper is permeable and provides a fluid path between the hollow plunger and the internal volume of the barrel. In example embodiments, the fluid path is capillary. In example embodiments, the capillary fluid path is of a diameter equal to, or less than, 0.2 mm.

In one example embodiment of the present invention, the hollow plunger 120 includes inner threading 122 and an inner barrier 123 (most clearly seen in FIG. 4E) at the inner side of the hollow plunger 120.

In an example embodiment, the hollow plunger 120 is in the shape and form that would protect the material/reagent container 130 from inadvertent damage or emptying. In another example embodiment, the material/reagent container 130 is in the form of at least two flexible layers (e.g., elastic/flexible polyurethane), having a barrier that is non-permeable to oxygen and humidity, having been welded or otherwise attached together in order to contain the material/reagent 131 between them. In example embodiments, the flexible container is made of butyl rubber. In example embodiments, the flexible container is made of laminated aluminum. It should be understood, however, that any composition of materials used for manufacturing the material/reagent container 130 is within the scope of the present invention.

In the depicted example embodiment, the metering rod 140 has outer/external threading 141 that corresponds to the inner threading 122 of the hollow plunger 120. According to the instant example embodiment, the metering rod is twisted/rotated in order to advance the rod down the hollow plunger 120. However, it is made clear that any configuration that facilitates advancing the metering rod is considered within the scope of the invention.

The metering rod 140 is adapted to be inserted in the open proximal end of the hollow plunger 120 so as to enclose the container 130 therein. The metering rod 140 is adapted to be advanced within the hollow plunger 120 from the open proximal end to the distal end thereof in predetermined increments.

In embodiments, the predetermined increments are demarcated by geometric impediments. In one example embodiment the geometric impediments include at least an inner barrier formed on an external surface of the metering rod and at least two bumpers formed an on an inner side of the hollow plunger. In one example embodiment the geometric impediments include at least two bumpers formed on an external surface of the metering rod and an inner barrier on an inner side of the hollow plunger. In embodiments, the demarcated increments are indicated by haptic feedback. In embodiments, the demarcated increments are indicated by auditory feedback. In embodiments, the predetermined increments are indicated by visual feedback.

In the example embodiment depicted in the Figures, the metering rod also includes bumpers 142, 143 and 144 that correspond to, and physically interact with, the inner barrier 123 of the hollow plunger 120 as further detailed herein. The bumpers can be configured to provide haptic, and/or auditory, and/or visual feedback. It should be noted that the metering rod 140 in its state as shown in FIG. 4A is not engaged with the material/reagent container 130 to a degree that would result in puncturing the material/reagent container 130 by the spike 121 of the hollow plunger 120 or otherwise.

Both the hollow plunger 120 and the metering rod 140 may be made of elastomeric plastic or any other material which is consistent with the purpose of the present invention. The material/reagent container 130 may take the form of a sphere, convex disc, bellow, or any other form which is consistent with the purpose of the present invention.

In the depicted embodiment, the mixing syringe 100 operationally interacts with a conventional medicament vial 200. In the example, the mixing syringe 100 is locked onto the medicament vial 200 through a vial adapter (e.g., a vented vial adapter) 500. Mixing syringe 100 provides the ability for a medical practitioner to mix a medicament 210 (e.g., an anesthetic solution) initially contained in the medicament vial 200 (and later aspirated into the headspace 150 created between the barrel 110 and the hollow plunger 120 of the mixing syringe 100 prior to injection to a patient) with a material reagent 131 initially contained in the material/reagent container 130 (and later aspirated into the headspace 150) in a manner that is economically feasible, is not excessively time-consuming and does not require the use of prior art conventional dental syringes nor prior art conventional cartridges nor prior art conventional double sided needles.

Figure 4B:
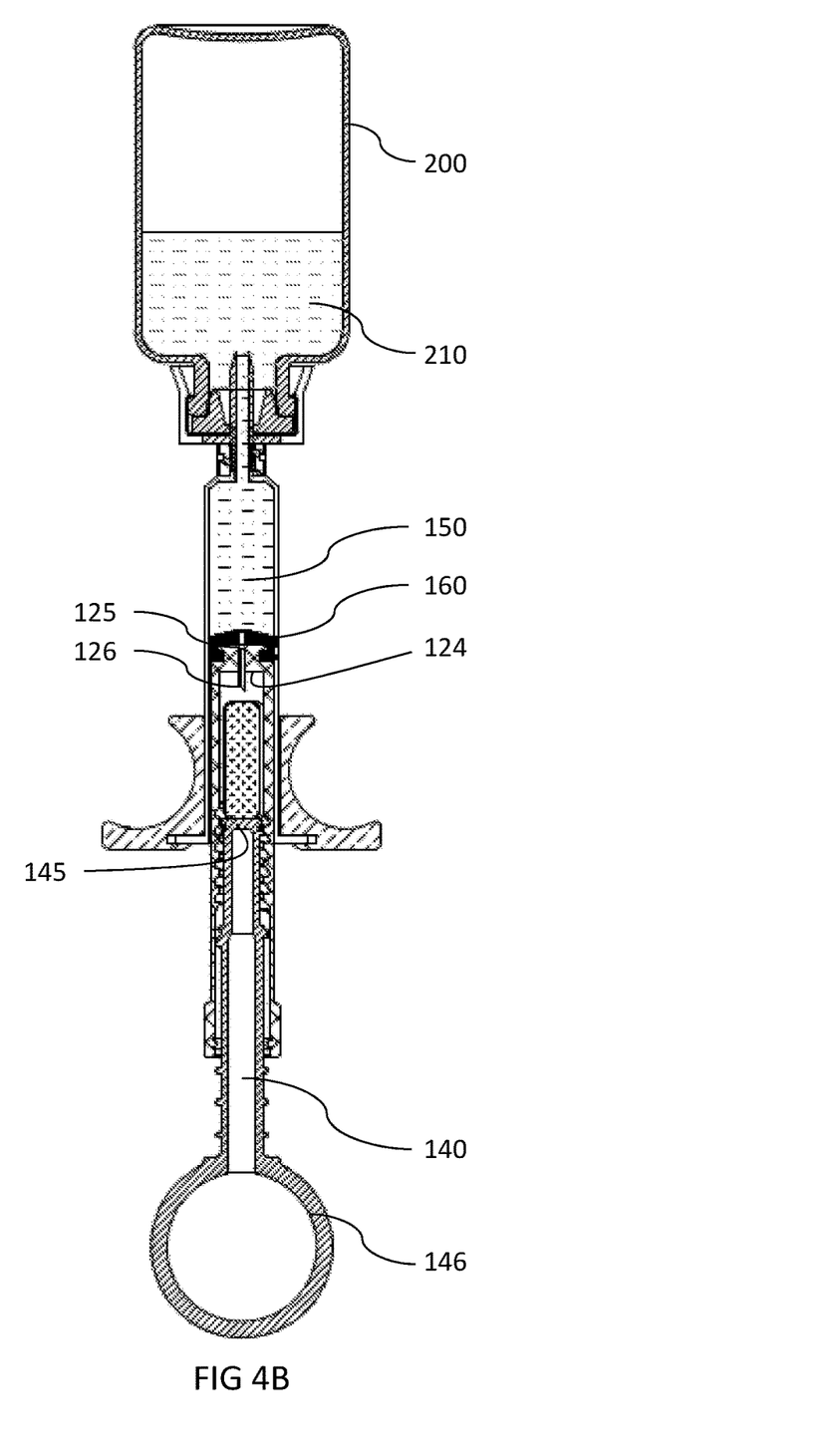
FIG. 4B is a cross sectional view of the mixing syringe in a state after the hollow plunger has been drawn back and a portion of medicament has been drawn out of the vial into the barrel of the mixing syringe.

FIG. 4B depicts a cross sectional view of the mixing syringe 100 of the present invention, in a state after the hollow plunger has been drawn back and a portion of a second material (e.g., a medicament fluid) 210 has been drawn out of the medicament vial 200 into the headspace 150. To effect the state depicted in FIG. 4B, the practitioner may insert their thumb into a thumb ring 146 of metering/dosage rod 140 (which is threaded into the hollow plunger 120) or otherwise draw the hollow plunger backwards while holding the mixing syringe 100 in a vertical orientation with the medicament vial 200 positioned above the mixing syringe 100 (as depicted in the Figure). Consequently, the second material (e.g., medicament) 210 is drawn into a headspace 150 of the mixing syringe 100.

Throughout the present document, the material that is adapted to be disposed in the headspace 150 of the barrel 110 is referred to as the 'second material'. However, for the sake of convenience and clarity, this material may alternatively be referred to as a 'medicament', drug', 'liquid', 'fluid' 'second liquid', 'second fluid', 'medicament liquid/fluid', and variations thereof. It is made clear that any use of a specific material such as 'liquid' or 'medicament/drug' is merely an example and by no way intended to limit the scope of the invention. Accordingly, as mention of a specific type of material as opposed to the wider term 'second material' is to be understood meaning the "a second material, such as a liquid" or "a second material, such as a medicament", etc.".

To be clear, the term 'second material' includes a solid, liquid, gas, any intervening state therebetween, and/or combinations thereof. For example, the material may refer to a gas, a liquid, a liquid with solid/insoluble particles disposed therein, a gel, a gel with solid/insoluble particles disposed therein, solid particles such as powder, and any combination thereof. For example, the first material may be water for injection or saline solution and the second material may be a lyophilized drug that is reconstituted by the first material. Other examples are discussed further herein.

The second material may be initially placed in the barrel (e.g., at time of manufacture of the syringe). Alternatively, the second material may be drawn (or inserted) into the syringe from an external source, prior to adding the first material into the barrel. Further alternatively, the second material may be drawn (or inserted) into the syringe from an external source, after placing the first material in the barrel.

Figure 4C:
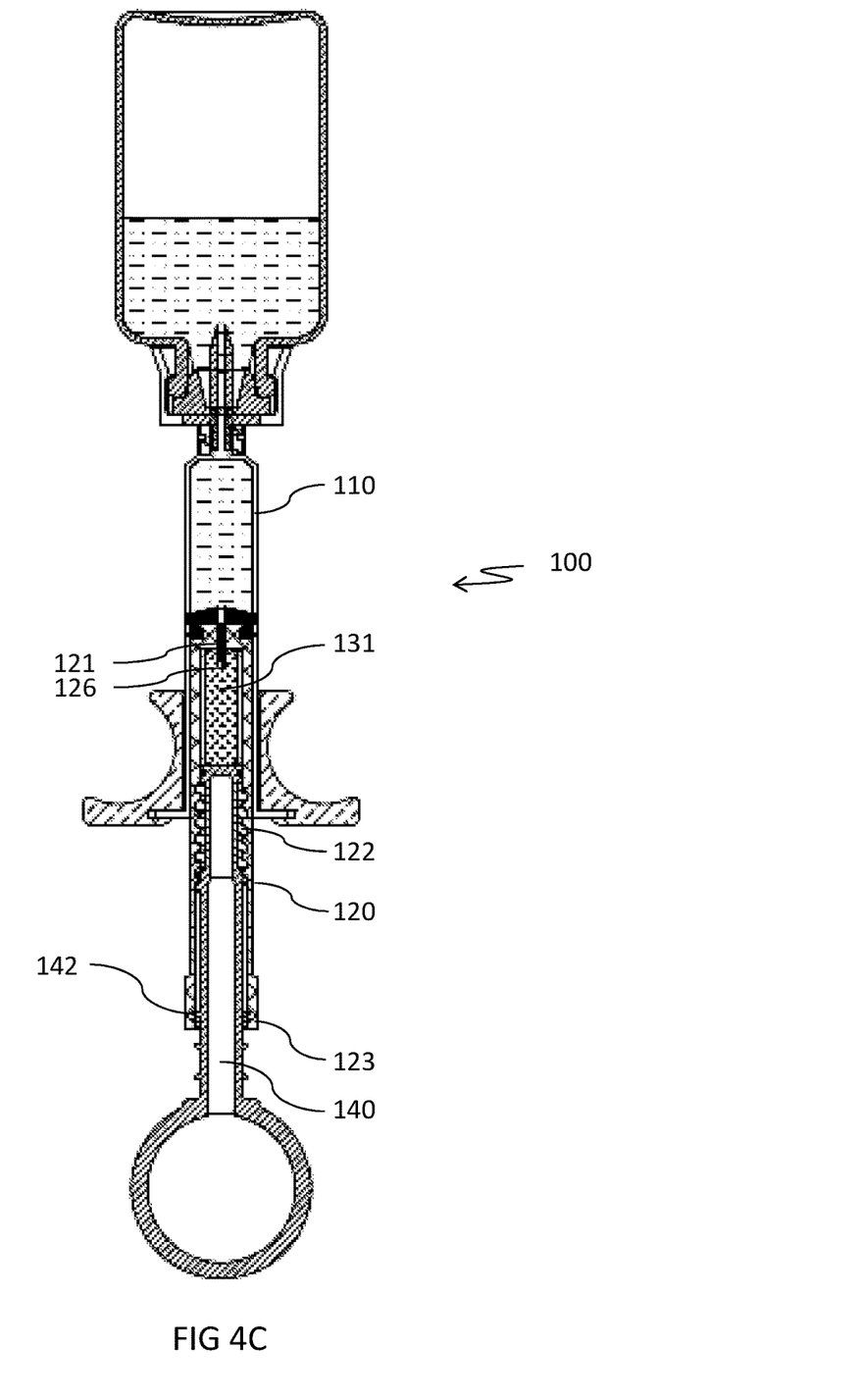
FIG. 4C is a cross sectional view of the mixing syringe of the present invention in which the metering rod is shown in its state after it has been advanced inside the hollow plunger to a degree that it pushes the reagent container to be punctured by the spike at the distal end of the hollow plunger.

FIG. 4C depicts a cross sectional view of an example embodiment of the mixing syringe 100 of the present invention in which the metering rod 140 is shown in its state after it has been advanced inside the hollow plunger 120 to a degree that it pushes the material/reagent container 130 to be punctured by the spike 121 at the distal end of the hollow plunger 120.

As mentioned, the predetermined increments are demarcated by geometric impediments. In embodiments, the geometric impediments are engaged by the intersecting geometry resulting from the relative positioning of the at least one bumper in respect to the inner barrier.

Advancing the metering rod in the predetermined increments is effected by advancing the metering rod in a manner that overcomes the interfering geometry of the one of the at least two bumpers physically interacting with the inner barrier until a subsequent bumper of the at least two bumpers meets the inner barrier.

The predetermined increments are determined by a space between the at least two bumpers. The space between the at least two bumpers is determined by the linear length between facing edges of the at least two bumpers disposed along the metering rod. The predetermined increments correspond to volume of first material afforded to flow between the container and the internal volume of the barrel.

In the example embodiment, it is intended that the metering/dosage rod 140 will be screwed further into the hollow plunger by a user (not shown) applying a relatively small turning force until the first bumper 142 of metering rod 140 is stopped by the interfering geometry of inner barrier 123 of the hollow plunger 120. In order to overcome that interfering geometry, the user is required to apply considerably more turning force than that initially applied for screwing metering rod 140 along the plunger 120. The linear positioning of the first bumper 142 along the metering rod 140 in relation to the linear positioning of the inner barrier 123 along the hollow plunger 120 is such that before the first bumper 142 overcomes the interfering geometry of inner barrier 123 a tip 126 of spike 121 has not penetrated the reagent container 130 while after that first bumper 142 overcomes that interfering geometry the spike 121 has fully penetrated the material/reagent container 130. It should be noted that in this stage, no substantial squeezing force is applied on the material/reagent container 130 held between the distal wall 124 (see FIG. 4B) of the hollow plunger 120 and the distal end 145 (see FIG. 4B) of the metering rod 140.

Figure 4D:
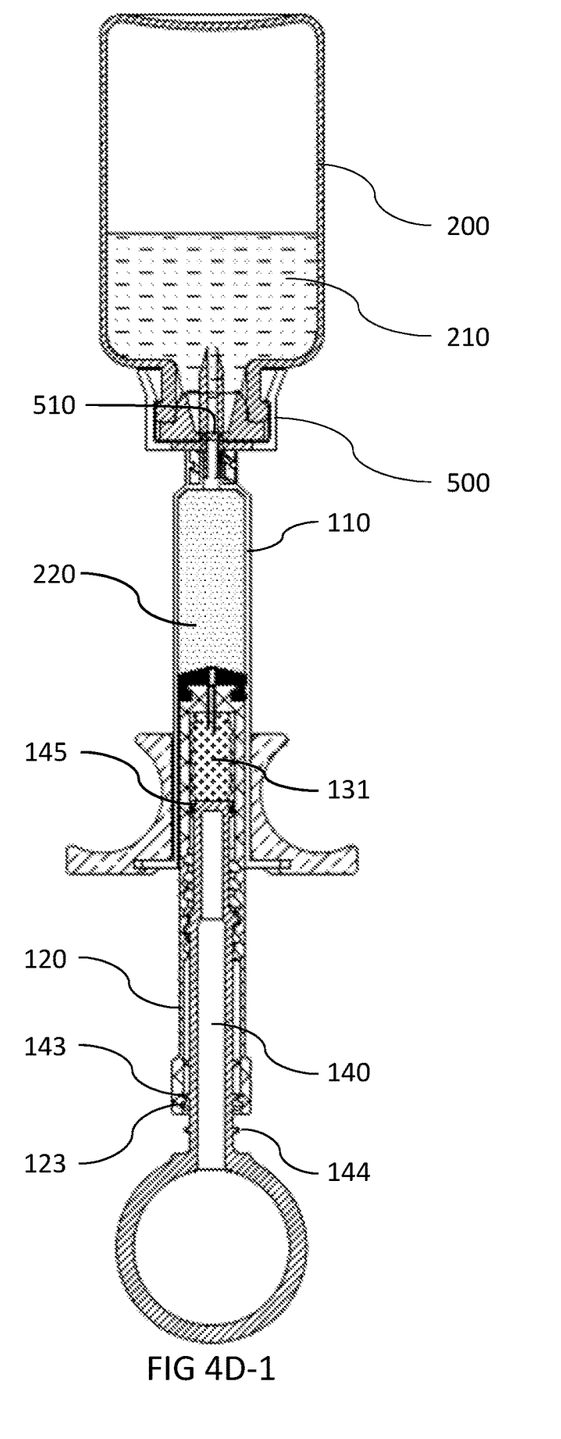

FIG. 4D-1 depicts a cross sectional view of the mixing syringe 100 of the present invention, in which the metering rod 140 is shown in a state after it has squeezed the material/reagent container 130 to expel first material (e.g., reagent) 131, in a predetermined volume, into the headspace 150 to mix with the second material (e.g., medicament) 210 already present therein. In order to effect the depicted state of the syringe, the user further screws the metering rod 140 along the hollow plunger 120 until the second bumper 143 of metering rod 140 is forced to overcome the intersecting geometry of the inner barrier 123. Each turning movement of metering rod 140 that advances it down the hollow plunger 120 now causes the distal end 145 of metering rod 140 to apply a constant squeezing force upon the material/reagent container 130.

The predetermined increments in which the metering rod is advanced correspond to a volume of the first material compelled to flow between the container and an internal volume of the barrel. In the example embodiment, the linear positioning of the second bumper 143 along metering rod 140 in relation to the linear positioning of the inner barrier 123 along the hollow plunger 120 is such that when second bumper 143 overcomes the interfering geometry of inner barrier 123 the predetermined volume of reagent 131 has been expelled from the first material (reagent) container 130 through the spike 121 and through a stopper 160, into the headspace 150 of the barrel 110 of the mixing syringe 100. In an example embodiment, the same volume of reagent 131 expelled from the material/reagent container 130 also passes through a one-way valve 125 (see FIG. 4B) also known as a check valve.

In an example embodiment to the present invention depicted in FIG. 4D-1, the vial adapter 500 includes a one-way valve 510 (also known as a check valve) so as to prevent the second material (e.g., medicament) 210, the first material (e.g., reagent 131) or the mixture thereof 220, from inadvertently flowing through the distal end of the barrel 110 into the medicament vial 200. One skilled in the art would appreciate that once the second material (e.g., medicament) 210 has been aspirated from the medicament vial 200 into the syringe headspace 150, the continued attachment of the medicament vial 200 to the distal end of the barrel 110 is not necessary.

In another example embodiment to the present invention, the reagent container 130 is not penetrated by a spike 121 but is rather composed of such materials, form and shape that upon squeezing it to a certain degree it erupts so that at least a part of its content leaves the erupted material/reagent container 130. It should be understood that any method for extracting the first material/reagent 131 from the material/reagent container 130 and allowing the first material/reagent 131 to flow into the headspace 150, whether fully or in a metered fashion, is within the scope of the present invention.

Figure 4D:
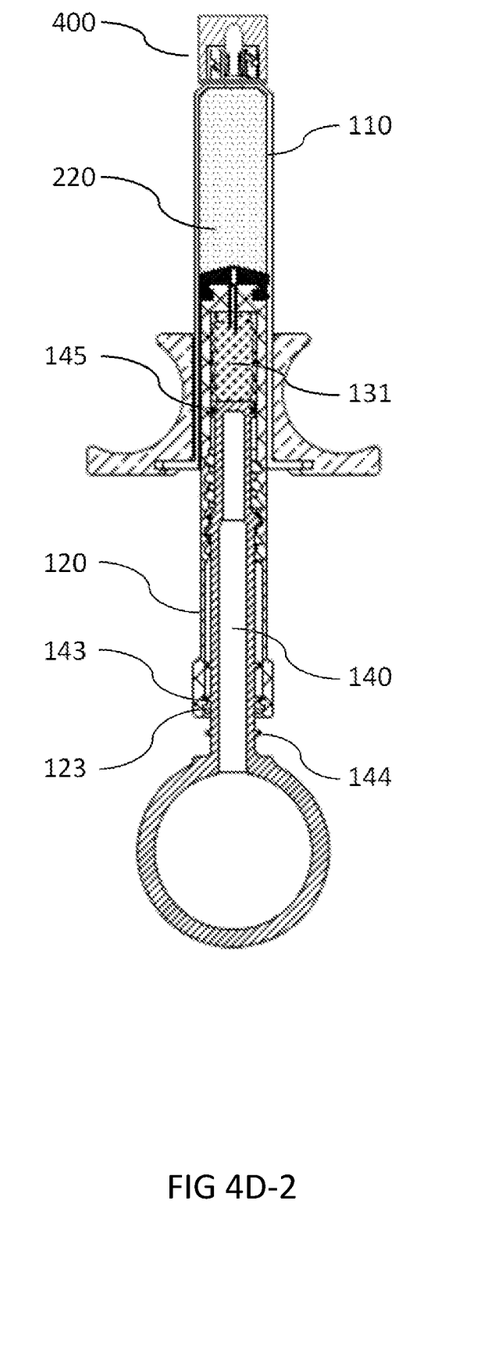

FIG. 4D-2 depicts a cross sectional view of the mixing syringe 100 of the present invention in the same state as shown in FIG. 4D-1, except for the fact that the barrel 110 is now detached from the vial adapter 500 (not shown), while that vial adapter 500 is still attached at its other end to the medicament vial 200 (not shown). In the example embodiment, a cap 400 is applied to the distal end of the barrel 110 to prevent the second material (e.g., medicament) 210, the first material (e.g., reagent) 131 or the mixture thereof 220 from inadvertently flowing from headspace 150 through the distal end of the barrel 110 to the outer environment.

One skilled in the art would appreciate that the volume of first material/reagent 131 expelled into the headspace 150 is not substantially affected by the attachment of either a vial adapter 500 or a cap 400 to the distal end of the barrel 110 as depicted in FIGS. 4D-1 and 4D-2 respectively.

Figure 4E:
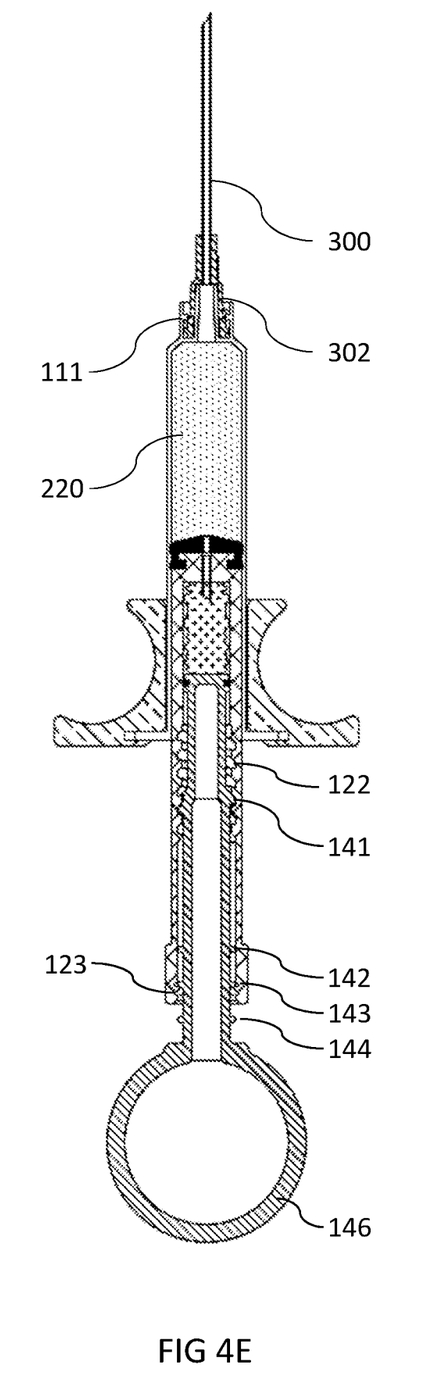
FIG. 4E is a cross sectional view of an embodiment of a mixing syringe of the present invention in which a needle has been affixed to the distal end of the syringe.

FIG. 4E depicts a cross sectional view of an embodiment of a mixing syringe of the present invention in which a needle 300 has been affixed to the distal end of the syringe. For example, a hypodermic needle 300 with a female Luer lock coupling arrangement 302 is coupled to the Luer lock 111 male connector at the distal end of the barrel 110.

Figure 4F:
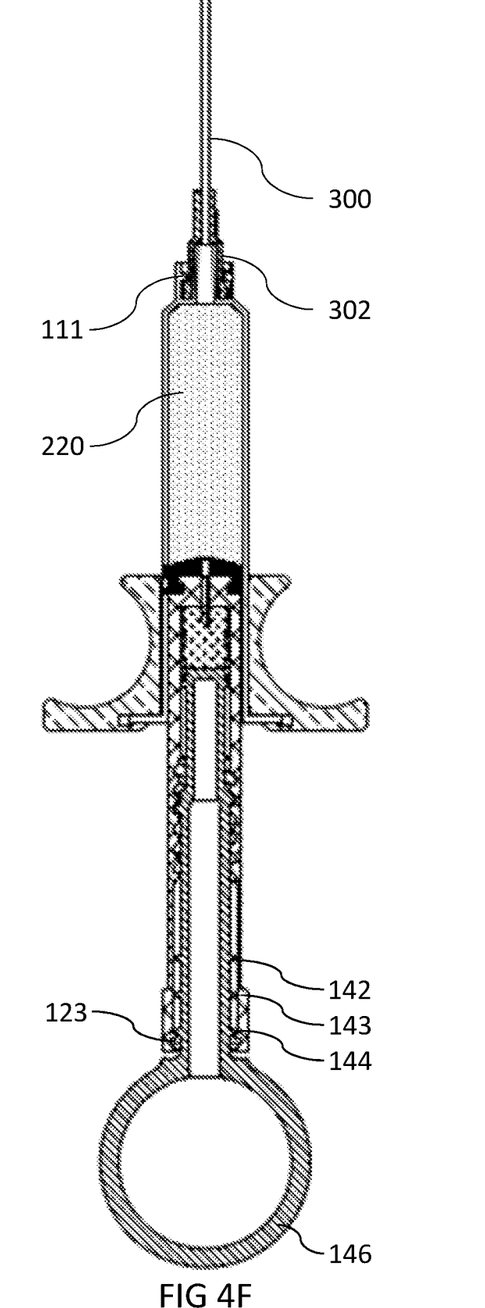
FIG. 4F is a cross sectional view of an embodiment of a mixing syringe of the present invention as shown in FIG. 4E in which the metering rod is shown in its state after it has further squeezed the reagent container, expelling more reagent into the barrel of the syringe.

One skilled in the art would appreciate that a needle 300 is to be applied to the tip of the mixing syringe 100 in order to inject its content to a patient, whether that content has been mixed with a relatively smaller volume of material/reagent 131, as depicted in FIG. 4E or with a relatively larger volume of material/reagent 131, as depicted in FIG. 4F.

It should be understood that in embodiments, a needle 300 is not applied to the tip of the mixing syringe 100 as depicted in FIGS. 4E and 4F, and that the vial adapter 500 or the cap 400 are not detached from to the distal end of the barrel 110 as depicted in FIGS. 4D-1 and 4D-2 respectively, until the entire volume of second material (e.g., medicament) 210 inside the barrel has been mixed with the entire corresponding volume of the first material (e.g., reagent) 131.

In example embodiments, each predetermined volume of material/reagent 131 equals 0.1 mL or such other volume that would be optimal to react with the predetermined volume of medicament 210 in the headspace 150, for example, the volume to buffer 1 mL anesthetic that was drawn, or is yet to be drawn, from vial 200 into the headspace 150. It should be noted that the volume of material/reagent 131 expelled to that space 150 applies force that pushes the hollow plunger 120 outwards from the barrel 110.

Predetermined volumes of first material (e.g., reagent) 131 are to be subsequently expelled, for example in 0.1 mL increments, when progressing the metering rod between the second 142 and third 144 bumpers, and then again between the third bumper 144 and the ring 146. In other embodiments, there may be additional bumpers. It is made clear that the predetermined volume of first material is expelled when the metering rod is advanced between any two successive bumpers once the container has been ruptured/punctured. Accordingly, for example, after the first bumper 142 any additional bumper set along metering rod 140 that overcomes the interfering geometry of the inner barrier 123, further injects a predetermined amount of first material/reagent 131 into the headspace 150. It should be understood that the provision of only three bumpers 142, 143 and 144 is not exhaustive and is provided herein for illustration purposes only and that metering rod 140 may include more bumpers, each designed to expel a predetermined volume (e.g., 0.1 mL) of first material/reagent 131, such as $NaHCO_3$, into the headspace 150.

It should be understood that the description of medicament 210 being stored in an external medicament vial 200 and material/reagent 131 being contained in reagent/material container 130 is provided herein for illustration purposes only and that each of them may be stored in the medicament vial 200 or in the material/reagent container 130 interchangeably as long as they are eventually mixed inside the headspace 150 in accordance with the teachings of the present invention.

In another embodiment of the present invention, the turning force applied by the user (not shown) on metering rod 140 for bumpers 142, 143 and 144 to overcome the interfering geometry of inner barrier 123 is not substantially different from the turning force used by that user for screwing the metering rod 140 before or after such interference. According to this embodiment, the interference between each of these bumpers and the inner barrier 123 results in an audible sound that signals to that user that, depending on the sequence of sounds, the material/reagent container 130 has been punctured or that additional predetermined volume of material/regent 131 (e.g., $NaHCO_3$ at 0.1 mL increments), has been expelled into the headspace 150.

FIG. 4F depicts a cross sectional view of an embodiment of a mixing syringe 100 of the present invention in which the metering rod 140 is shown in a state after it has further squeezed the material/reagent container 130, expelling additional predetermined volume of the first material (e.g., reagent) 131 into the headspace 150 compared to the volume expelled in the state depicted in FIGS. 4D-1 and 4D-2 respectively. To effect the instantly depicted state, the user once again rotates the metering rod 140 until the third bumper 144 reaches and overcomes the intersecting geometry of the inner barrier 123.

As detailed heretofore, one embodiment of a method for using the mixing syringe can be summarized in the steps detailed hereafter. In an example embodiment, a mixing syringe of the instant invention is provided by a manufacturer. The syringe is intended for use on a single patient, and thereafter to be discarded. The syringe is prepackaged with the material/reagent container 130 disposed within the hollow plunger 120.

In the next step, the user conventionally draws the second material (e.g., medicament/e.g., drug solution) 210 from a medicament vial 200 into headspace 150. The aspiration of the second material 210 (e.g., medicament/drug solution) is preferably performed through a vial adaptor 500.

In the next step, the metering/dosage rod 140 is advanced (e.g., by rotating the metering rod) in a sufficient manner so as to puncture the material/reagent container (by pressing the container onto the spike 121). The length of advancement of the metering rod 140 along the hollow plunger 120 that is necessary to reach this state is demarcated or delineated by haptic indicator/feedback when overcoming the resistance to advancing the metering rod further. Alternatively, the milestone is marked by audible indication/feedback such as a click sound.

It should be understood that any method known in the art for advancing the metering rod 140 through the hollow plunger 120 is considered within the scope of the present invention including replacing the threaded metering rod 140 with a linear pushrod (not shown) that is adapted to move along the hollow plunger 120 as a result of linear forces applied on that pushrod by the user of the mixing syringe 100.

The next step is to advance the dosage rod 140 the desired number of bumps or clicks, in accordance with the volume of the first material, e.g., reagent, needed to interact, e.g., through buffering, with a drug solution 210. In the present example embodiment, each click, or bump, delineates a predetermined volume of first material (e.g., reagent) 131 that is expelled into the headspace 150. The first material 131 mixes with the second material (e.g., medicament) 210 previously drawn from the vial 200 to provide a drug-reagent mixture 220.

In many medical procedures, especially dental procedures, prior to injecting the patient, the practitioner (not shown) holds the barrel in one hand and uses the thumb of that same hand to pull the thumb ring 146 in order to perform an aspiration test, as is known in the art (generally to ensure that the needle is not in an artery; if blood is aspirated into the barrel or, in case of a conventional dental syringe, into the carpule then the test fails and the user needs to reposition the needle and repeat this test (possibly with a new carpule).

In the next step, the mixture/interaction of the first and second materials (e.g., medicament-reagent solution) 220 is injected into a patient (not shown), or some other location, by pushing the metering rod 140 which pushes both the hollow plunger 120 and the stopper 160 down the barrel 110. While sliding down the barrel 110, the stopper 160 expels the (medicament-reagent) mixture 220 from the headspace 150 through the hypodermic needle 300 and into patient's body (not shown).

According to a variation of the aforementioned method, the steps of puncturing the material/reagent container 130 and expelling the first material (e.g., reagent) 131 into the headspace 150 precede the steps of drawing the second material (e.g., medicament) from the vial. Accordingly, once the first material (e.g., reagent) 131 is expelled into the headspace 150, the user (not shown) now conventionally aspirates the second material (e.g., medicament/drug solution) 210 from a medicament vial 200 into headspace 150 in order for the second material (e.g., medicament/drug solution) 210 to be mixed with the first material (e.g., reagent) 131 which is already in the headspace 150. In some embodiments, the aspiration of second material (e.g., medicament/drug solution) 210 is preferably performed through a vial adaptor 500. In some embodiments, that vial adaptor 500 includes a one-way valve 510 (also known as check valve).

Following negative aspiration (i.e., no blood aspirated into the barrel 110) in an aspiration test known in the art, the (medicament-reagent) mixture 220 is then injected to a patient (not shown) by pushing the metering rod 140 which pushes both the hollow plunger 120 and the stopper 160 down the barrel 110. While sliding down the barrel 110, the stopper 160 expels the (medicament-reagent) mixture 220 (for example, buffered anesthetic), from the headspace 150 through a hypodermic needle 300 and into patient's body (not shown).

In one embodiment of the present invention, the mixing syringe is intended specifically for local anesthesia in dental procedures. According to this example embodiment, the proximal end of metering rod 140 includes a thumb ring 146 for using clinical methods known in the art including pre-injection aspiration test. In example embodiments, the plunger 120 also includes a one-way valve 125 (also known as check valve—see FIG. 4B) for preventing the second material (e.g., medicament/drug solution) 210 or the [medicament-reagent] mixture 220, (e.g., buffered anesthetic), from returning to either the material/reagent container 130 or to any part of the hollow plunger 120. It should be understood that the terms one-way valve and check valve are provided herein for illustration purposes only and that any method used for preventing bi-directional flow of materials or of the mixture/interaction thereof is in the scope of the present invention.

While embodiments of the present invention have been disclosed, it will be appreciated by those skilled in the art that the invention is subject to variations and modifications, and it is intended that the invention will not be limited only by the following claims. For example, as alternatives to the embodiments disclosed, the metering rod may include three or more bumpers, allowing the mixing of variable volumes of one type of medicament (e.g., a liquid state drug) with the variable volumes of another type of material (e.g., a gas state reagent) expelled from the material/reagent container 130. The mixing syringe 100 may serve to enhance the in-situ mixing of chemicals in applications not specifically mentioned here or in applications not yet contemplated. The materials contained in the material/reagent container 130 may be, or include, solid particles (e.g., a powdered substance), fluid, gas, gel, viscous material, or a mixture of any or all of the above. Coloring, clouding, other reagents, or other materials/reagents 131 may be used to visually indicate mixing of the components or leakage from the material/reagent container 130. The stopper 160 may be rubber, or an elastoplastic composition that is rigid, semi-rigid, or mainly rigid and/or including an elastic portion. Alternatively, the stopper may be mainly elastic/flexible with a rigid portion, or it may be elastic plastic. Any of the parts may include features that improve, simplify or shorten the manufacturing of those parts or improve, simplify or shorten the assembling of the overall apparatus. Any of the parts or the overall apparatus may include features that improve the visual marketing appeal of the apparatus. The hollow plunger 120, the metering rod 140 and the stopper 160, while described in the embodiments as having a generally circular cross-section in one plane, may have any other shape in cross-section that permits use.

While the invention has been described with respect to a limited number of embodiments, it will be appreciated that many variations, modifications and other applications of the invention may be made. Therefore, the claimed invention as recited in the claims that follow is not limited to the embodiments described herein.

What is claimed is:

1. A mixing syringe, comprising:
   a barrel;
   a hollow plunger disposed inside the barrel, the hollow plunger having a stopper disposed on a distal end thereof and an open proximal end;
   a flexible container disposed inside the hollow plunger, the container containing a first material;

a metering rod adapted to be inserted in the open proximal end of the hollow plunger so as to enclose the container therein, the metering rod adapted to be advanced within the hollow plunger from the open proximal end to the distal end thereof in predetermined increments;

wherein the predetermined increments are demarcated by geometric impediments;

wherein the geometric impediments include at least two bumpers formed on an external surface of the metering rod and an inner barrier on an inner side of the hollow plunger or at least an inner barrier formed on the external surface of the metering rod and at least two bumpers formed on the inner side of the hollow plunger;

wherein advancing the metering rod in the predetermined increments is affected by advancing the metering rod in a manner that overcomes the interfering geometry of the one of the at least two bumpers physically interacting with the inner barrier until a subsequent bumper of the at least two bumpers meets the inner barrier.

2. The mixing syringe of claim 1, wherein the container has a first state, whereby the container is sealed, and a second state whereby the skin of the container is ruptured as a result of the metering rod being advanced sufficiently to assert pressure on the container in a sufficient quantity so as to transform the container from the first state to the second state.

3. The mixing syringe of claim 2, wherein the container is adapted to be ruptured as a result of being punctured by a puncturing member under the pressure asserted when the metering rod is advanced.

4. The mixing syringe of claim 3, wherein the puncturing member is a hollow spike disposed at a distal end of the hollow plunger, the hollow spike provides a fluid communication path between the container and an internal volume of the barrel.

5. The mixing syringe of claim 2, wherein the stopper is permeable and provides a fluid path between the hollow plunger and the internal volume of the barrel, wherein the fluid path is unidirectional.

6. The mixing syringe of claim 1, wherein the metering rod has a threaded external surface and the hollow plunger has a corresponding threaded on an internal surface thereof such that the metering rod is advanced inside the hollow plunger by rotation of the metering rod.

7. The mixing syringe of claim 1, wherein the demarcated increments are indicated by indicators selected from the group including: haptic feedback, audible feedback, and visual feedback.

8. The mixing syringe of claim 1, wherein the predetermined increments are determined by spaces between two of the at least two bumpers and correspond to increments in the volume of the first material compelled to flow between the container and an internal volume of the barrel.

9. The mixing syringe of claim 1, wherein the flexible container is made of material selected from the group including: a high barrier sheet, butyl rubber and aluminum.

10. The mixing syringe of claim 1, wherein the first material contained inside the flexible container is in a state selected from the group including: liquid, gas, and a liquid state with solid particles disposed therein.

11. A system, comprising:

the mixing syringe of claim 1;

a medicament vial containing a liquid state medicament;

a vial adapter attached, at a proximal end thereof, to the mixing syringe and, at a distal end thereof, to the medicament vial, the vial adapter having a one-way valve so as to prevent materials from exiting the barrel of the mixing syringe into the medicament vial.

12. The system of claim 11, further comprising a cap adapted to be attached to a distal end of the barrel following detachment of the vial adapter therefrom so as to prevent materials from exiting the barrel of the mixing syringe.

13. The system of claim 12, wherein a replacement non-valved vial adapter that does not include a one-way valve is adapted to be used instead of the vial adapter.

14. A method of mixing two materials in a syringe, comprising the steps of:

(a) providing the mixing syringe of claim 1;

(b) providing the second material inside the barrel of the mixing syringe;

(c) advancing the metering rod so as to transform the container from the first state to the second state;

(d) advancing the metering rod by at least one increment of the predetermined increments to expel a predetermined quantity of the first material into the barrel to mix with the second material.

15. The method of claim 14, wherein the second material is a medicament, and the first material is selected from a group of: a reagent to the medicament or an alkalinization agent to the medicament.

16. The method of claim 14, comprising: performing steps (c) and (d) before step (b).

17. The method of claim 14, wherein only step (a) is performed while a second material is already present inside the inner volume of the barrel.

18. The method of claim 17, wherein the second material is in a powder form.

19. The method of claim 14, wherein the first material is used to reconstitute the second material.

\* \* \* \* \*